United States Patent [19]
Morris et al.

[11] Patent Number: 5,989,663
[45] Date of Patent: Nov. 23, 1999

[54] BLOW-MOLDING POLYESTERS FROM TEREPHTHALIC ACID, 2, 2, 4, 4-TETRAMETHYL-1,3-CYCLOBUTANEDIOL, AND ETHYLENE GLYCOL

[75] Inventors: John C. Morris; James R. Bradley; Kab Sik Seo, all of Kingsport, Tenn.

[73] Assignee: Eastman Chemical Company, Kingsport, Tenn.

[21] Appl. No.: 08/997,629

[22] Filed: Dec. 23, 1997

Related U.S. Application Data

[60] Provisional application No. 60/034,988, Dec. 30, 1996.

[51] Int. Cl.$^6$ .......................... B29D 22/00; B29D 63/00; C08G 63/00

[52] U.S. Cl. .................. 428/35.7; 528/272; 528/275; 528/281; 528/283; 528/298; 528/308; 528/308.6; 428/364

[58] Field of Search ..................................... 528/272, 275, 528/281, 283, 298, 307, 308, 308.6; 428/364, 35.7

[56] References Cited

U.S. PATENT DOCUMENTS

| | | |
|---|---|---|
| 2,210,817 | 8/1940 | Peterson . |
| 2,787,632 | 4/1957 | Stevens . |
| 2,789,968 | 4/1957 | Reynolds et al. . |
| 3,022,272 | 2/1962 | Schnell et al. . |
| 3,030,335 | 4/1962 | Goldberg . |
| 3,313,777 | 4/1967 | Elam et al. . |
| 3,317,466 | 5/1967 | Caldwell et al. . |
| 3,335,111 | 8/1967 | Pray et al. . |
| 3,772,405 | 11/1973 | Hamb . |
| 4,182,726 | 1/1980 | Illuminati et al. . |
| 4,263,364 | 4/1981 | Seymour et al. . |
| 4,350,805 | 9/1982 | Jackson, Jr. et al. . |
| 4,585,854 | 4/1986 | Tung et al. . |
| 5,171,830 | 12/1992 | Grey . |

FOREIGN PATENT DOCUMENTS

| | | |
|---|---|---|
| 63-92644 | 4/1988 | Japan . |
| 64-1724 | 1/1989 | Japan . |

OTHER PUBLICATIONS

Caldwell et al., Defensive Publication T858,012, 858 O.G. 43, Jan. 7, 1969.

Gilkey et al., Defense Publication T873,016, 873 O.G. 1033, Apr. 28, 1970.

Coover et al., Defensive Publication T875,010, 875 O.G. 342, Jun. 9, 1970.

Haggin, "Catalytic Cosynthesis Method Developed," Chemical and Engineering News, pp. 25–26, May 4, 1992.

Gawlak et al., "Polycarbonates from the 2,2,4,4,–Tetramethylcyclobutane–1,3–Diols," Chemistry And Industry, pp. 1148–1149, Jun. 23, 1962.

Schnell "Chemistry And Physics of Polycarbonates, Polymer Reviews," vol. 9, Interscience Publishers (Germany), pp. 9–24, 1964.

*Primary Examiner*—Samuel A. Acquah
*Attorney, Agent, or Firm*—Betty J. Boshears; Harry J. Gwinnell

[57] ABSTRACT

The invention relates to a copolyester, having (a) a repeat unit of a dicarboxylic acid component, having from 80 to 100 mole % terephthalic acid or the corresponding ester thereof, and from 0 to 20 mole % of a modifying aromatic dicarboxylic acid having less than or equal to 20 carbon atoms or the corresponding ester thereof, wherein the total mole % of dicarboxylic acid component is equal to 100 mole %; and (b) a repeat unit of a glycol component, having from 5 to 85 mole % 2,2,4,4-tetramethyl-1,3-cyclobutanediol, ethylene glycol of from 15 to 95 mole %, and at least 1 mole % of a modifying glycol having from 3 to 16 carbon atoms, wherein the total mole % of glycol component is equal to 100 mole %. The invention also relates to a method of making the copolyester described above. The invention also relates to articles made from the copolyesters described above. The invention further relates to a method of determining the melt strength and sag of a polyester.

22 Claims, No Drawings

BLOW-MOLDING POLYESTERS FROM TEREPHTHALIC ACID, 2, 2, 4, 4-TETRAMETHYL-1,3-CYCLOBUTANEDIOL, AND ETHYLENE GLYCOL

CROSS REFERENCE TO RELATED APPLICATIONS

This application claims priority upon U.S. provisional application Ser. No. 60/034,988, filed Dec. 30, 1996, the contents of which are herein incorporated in their entirety by this reference.

FIELD OF THE INVENTION

The present invention relates to copolyesters having repeat units of terephthalic acid, 2,2,4,4-tetramethyl-1,3, cyclobutanediol and ethylene glycol. The copolyesters of the present invention exhibit high melt strength and low sag.

BACKGROUND OF THE INVENTION

Polyesters are commonly used for blow-molding oriented hollow articles such as beverage bottles and other containers. It is commercially important to be able to form containers having uniform sidewall thickness. A typical blow-molding manufacturing process involves 1) molding polymer pellets into specially shaped parisons; 2) extruding the parison to form a hollow polymer tube of uniform side wall thickness; 3) clamping a mold having the desired finished shape around the extrudate, and 4) blowing air into the hollow extrudate, causing the extrudate to stretch and expand to fill the mold. In order to form containers having uniform sidewall thickness, the polymer extrudate must maintain dimensional stability without excessive sag.

In order to achieve this objective, blow-molding facilities have 1) used polyesters exhibiting the best known melt strengths and 2) increased the rate of the blow-molding process. Melt strength is the ability of a material to maintain dimensional stability while in the softened or molten state. A material having high melt strength has a tendency to resist stretching and flowing as a result of gravitational force when in the softened or molten state. Melt strength has generally been determined by measuring the vertical length of an extrudate after a certain amount of time. Shorter lengths indicate better melt strength and, consequently, less sag.

Polyesters such as polyethylene terephthalate, poly (ethylene-co-1,4-cyclohexanedimethanol) terephthalate, and branched polyesters have been used in blow molding. The polyesters found most useful in extrusion blow molding operations have high melt strengths due to unusually high molecular weights. However, the utility of the ultra high molecular weight polymers is limited due to processing difficulties associated with their high melt viscosities and molecular weights. The use of branched polymers is a technique known for providing polymers which have been found to have adequate melt strengths for blow molding operations. However, branched polymers are often difficult to synthesize consistently.

Poly((70/30)ethylene-co-1,4-cyclohexanedimethanol) terepthalate is a relatively low viscosity linear polymer which has been widely used in blow-molding. It is more easily processed than polymers having branching or ultra high molecular weights.

The polyesters known to be useful in the art for blow-molding applications exhibit poor to moderate melt strength and sag. Therefore, commercial blow-molding has been limited to procedures that can be carried out relatively quickly so that the polymer material used does not significantly change in dimensional structure. The use of a relatively low viscosity polymer having good melt strength and good (low) sag would enable more latitude in developing blow-molding techniques for different products.

In light of the above it would be very desirable to provide polyesters having good melt strength and low sag. It would be especially useful for such polyesters to be easily machinable and melt processable. Such polyesters would be especially useful in the production of oriented articles, containers, bottles, fibers, films, and sheeting.

SUMMARY OF THE INVENTION

In accordance with the purpose(s) of this invention, as embodied and broadly described herein, this invention, in one aspect, relates to a copolyester, comprising a repeat unit of a dicarboxylic acid component, comprising from 80 to 100 mole % terephthalic acid or the corresponding ester thereof, and from 0 to 20 mole % of a modifying aromatic dicarboxylic acid having less than or equal to 20 carbon atoms or the corresponding ester thereof, wherein the total mole % of dicarboxylic acid component is equal to 100 mole %; and a repeat unit of a glycol component, comprising from 5 to 85 mole % 2,2,4,4-tetramethyl-1,3-cyclobutanediol, ethylene glycol of from 15 to 95 mole %, and at least 1 mole % of a modifying glycol having from 3 to 16 carbon atoms, wherein the total mole % of glycol component is equal to 100 mole %.

In another embodiment, the invention provides a method of producing a copolyester, comprising admixing a dicarboxylic acid component, comprising from 80 to 100 mole % terephthalic acid or the corresponding ester thereof, and from 0 to 20 mole % of a modifying aromatic dicarboxylic acid having less than or equal to 20 carbon atoms or the corresponding ester thereof, wherein the total mole % of dicarboxylic acid component is equal to 100 mole % and a glycol component, comprising from 5 to 85 mole % 2,2,4, 4-tetramethyl-1,3-cyclobutanediol, ethylene glycol of from 15 to 95 mole %, and least 1 mole % of a modifying glycol having from 3 to 16 carbon atoms, wherein the total mole % of glycol component is equal to 100 mole %, and then heating the admixture at a temperature of from 150° C. to 220° C. in the presence of a catalyst. The method continues with the further heating the admixture of step (a) at from 220 to 320° C. and, finally, with applying a vacuum to remove the glycol component that did not react with the dicarboxylic acid component to produce the copolyester.

The present invention also provides a method of determining the melt strength a polymer, comprising extruding substantially vertically a polymer through a capillary having a selected diameter at a temperature and shear rate to produce an extrudate having an upper and a lower end and having a length of from 50 to 250 times the selected diameter of the capillary in from 5 to 100 seconds, and measuring the diameter of the extrudate at a point of from 25 to 50% above the lower end of the extrudate, and calculating the ratio of the selected diameter of the capillary to the diameter of the extrudate.

The invention further provides a method of determining the sag of a polymer, comprising extruding substantially vertically a polymer through a capillary having a selected diameter at a temperature and shear rate to produce an extrudate having an upper and a lower end and having a length of from 50 to 250 times the selected diameter of the capillary in from 5 to 100 seconds, and measuring the length of the extrudate at a given time, and calculating the ratio of the measured length and the hypothetical unsagged length.

In another embodiment, the present invention provides a blend, comprising from 5 to 95 weight % of a copolyester, comprising a repeat unit of a dicarboxylic acid component, comprising from 80 to 100 mole % terephthalic acid or the corresponding ester thereof, and from 0 to 20 mole % of a modifying aromatic dicarboxylic acid having less than or equal to 20 carbon atoms or the corresponding ester thereof, wherein the total mole % of dicarboxylic acid component is equal to 100 mole % and a repeat unit of a glycol component, comprising from 5 to 85 mole % 2,2,4,4-tetramethyl-1,3-cyclobutanediol, ethylene glycol of from 15 to 95 mole %, and less than 10 mole % of a modifying glycol having from 3 to 16 carbon atoms, wherein the total mole % of glycol component is equal to 100 mole %, and from 95 to 5 mole % of an additive. Suitable additives include a poly(ether-imide); a polyphenylene oxide; a poly(phenylene oxide)/polystyrene blend; a polyester; a polyphenylene sulfide; a polyphenylene sulfide/sulfone; a poly(ester-carbonate); a polycarbonate; a polysulfone; a polysulfone ether; a poly(ether-ketone) of an aromatic dihydroxy compound; a flame retardant; a halogen compound; a halogen compound in combination with an antimony compound; a filler; a reinforcing agent; a carbon fiber, or a combination thereof.

The invention further provides a process for producing the above-described copolyester by heating about 80 to 100 mol % terephthalic acid or corresponding esters thereof, and 0 to about 20 mol % modifying aromatic dicarboxylic acids having about 2 to 20 carbon atoms or corresponding esters thereof, wherein the total mol % of dicarboxylic acids is equal to 100 mol % and about 5 to 85 mol % 2,2,4,4-tetramethyl-1,3-cyclobutanediol, about 15 to 95 mol % ethylene glycol, and less than 10 mol % modifying glycols having 3 to 16 carbon atoms, wherein the total mol % of glycols is equal to 100 mol % at a temperature of about 150° C. to 220° C. in the presence of a catalyst for a time sufficient to react a significant portion of the distillable ethylene glycol, and then further heating the mixture of step (1) at about 220 to 320° C. for about 1 to 2 hours, and, thereafter, applying a vacuum sufficient to remove any unreacted glycols.

Finally, the invention relates to a method of determining the melt strength and sag of a polymer comprising the steps of vertically extruding a polymer through a capillary having a diameter at a temperature and shear rate sufficient to provide an extrudate having a length of about 50 to 250 times the diameter of the capillary in about 5 to 100 seconds, measuring the diameter of the extrudate at a point about 25 to 50% above the lower end of the extrudate, and calculating the ratio of the diameter of the extrusion capillary to the diameter of the extrudate, and measuring the length of the extrudate at a given time, and calculating the ratio of the length measured and the hypothetical unsagged length.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

The present invention may be understood more readily by reference to the following detailed description of preferred embodiments of the invention and the Examples included therein.

Before the present compositions of matter and methods are disclosed and described, it is to be understood that this invention is not limited to specific synthetic methods or to particular formulations, as such may, of course, vary. It is also to be understood that the terminology used herein is for the purpose of describing particular embodiments only and is not intended to be limiting.

In this specification and in the claims which follow, reference will be made to a number of terms which shall be defined to have the following meanings:

The singular forms "a," "an" and "the" include plural referents unless the context clearly dictates otherwise.

"Optional" or "optionally" means that the subsequently described event or circumstance may or may not occur, and that the description includes instances where said event or circumstance occurs and instances where it does not.

In accordance with the purpose(s) of this invention, as embodied and broadly described herein, this invention, in one aspect, relates to a copolyester, comprising:

(a) a repeat unit of a dicarboxylic acid component, comprising from 80 to 100 mole % terephthalic acid or the corresponding ester thereof, and from 0 to 20 mole % of a modifying aromatic dicarboxylic acid having less than or equal to 20 carbon atoms or the corresponding ester thereof, wherein the total mole % of dicarboxylic acid component is equal to 100 mole %; and (b) a repeat unit of a glycol component, comprising from 5 to 85 mole % 2,2,4,4-tetramethyl-1,3-cyclobutanediol, ethylene glycol of from 15 to 95 mole %, and at least 1 mole % of a modifying glycol having from 3 to 16 carbon atoms, wherein the total mole % of glycol component is equal to 100 mole %.

The applicants have unexpectedly discovered a copolyester that has surprisingly high dimensional stability, as demonstrated by high melt strength and low sag. The copolyester of the present invention exhibits substantially higher melt strength and lower sag than known polyesters of similar molecular weight. These performance properties are due to the particular amounts of terephthalic acid units, 2,2,4,4-tetramethyl-1,3-cyclobutanediol units (cis, trans, or a mixture thereof), and ethylene glycol units which form the copolyester.

It is known in the art to combine 2,2,4,4-tetramethyl-1,3-cyclobutanediol with ethylene glycol to produce the glycol component of a copolyester. However, an unexpected large increase in dimensional stability was discovered when polyethylene terephthalate (of which the glycol component constitutes 100 mol % ethylene glycol units) was modified with as little as 5 mole % 2,2,4,4-tetramethyl-1,3-cyclobutanediol units. In addition, the copolyesters of the present invention were found to maintain adequate dimensional stability over a broader range of molding temperatures than existing blow-moldable polyesters.

In one embodiment, the copolyester is from 80 to 100 mole % terephthalic acid units or corresponding esters thereof, and from 0 to 20 mole % of a modifying aromatic dicarboxylic acid having up to 20 carbon atoms or the corresponding ester thereof, wherein the total mole % of dicarboxylic acid component is equal to 100 mole %.

In another embodiment, the glycol component is from 5 to 85 mole % 2,2,4,4-tetramethyl-1,3-cyclobutanediol, from 15 to 95 mole % ethylene glycol, and at least 1 mole % of a modifying glycol having from 3 to 16 carbon atoms, wherein the total mole % of the glycol component is equal to 100 mole %. "Copolyester" is defined herein as a polyester having three or more polyester monomers.

Terephthalic acid units, or esters thereof, make up the dicarboxylic acid component of the present copolyester at a concentration of at least about 80 mole %, preferably at least 90 mole %, with a mole % of about 100 being most preferred, such that the total dicarboxylic acid content is equal to 100 mole %. About 80 mole % terephthalic acid is required in order to maintain high impact strength, good extrudability, injectability and otherwise general performance plastics machinabililty. Higher amounts of terephthalic acid are preferred in order to produce a higher impact strength copolyester. Terephthalic acid is beneficial due to its rigidity and linearity. Other similar para-substituted aromatic dicarboxylic acids may be used in the invention, but are not generally as economical to use as the predominate dicarboxylic acid (terephthalic acid).

In another embodiment, the dicarboxylic acid component can have up to 20 mole % of a modifying dicarboxylic acid, preferably less than 10 mole %. Modifying aromatic dicarboxylic acids which may be used in the present invention are those having up to about 20 carbon atoms, and which are either linear, para-oriented, or symmetrical. Examples of modifying aromatic dicarboxylic acids useful in the invention include, but are not limited to, isophthalic acid; 4,4'-biphenyldicarboxylic acid; 1,4-, 1,5-, 2,6-, or 2,7-naphthalenedicarboxylic acid; trans-4,4'-stilbenedicarboxylic acid; or mixtures or esters thereof.

In another embodiment, the dicarboxylic acid component can be further modified with up to 10 mole % of an aliphatic dicarboxylic acid having from 2 to 16 carbon atoms. Examples of aliphatic dicarboxylic acids include, but are not limited to, malonic acid, succinic acid, glutaric acid, adipic acid, pimelic acid, suberic acid, azelaic acid, or dodecanedioic acid. The presence of much more than 10 mole % of an aliphatic dicarboxylic acid is not useful because it would decrease the glass transition temperature and heat resistance of the copolyester.

Corresponding esters of terephthalic acid, the modifying aromatic dicarboxylic acid, and the aliphatic dicarboxylic acid can be used in the present invention. Examples of dicarboxylic acid esters include, but are not limited to, a dimethyl ester, a dipropyl ester, a diisopropyl ester, a dibutyl ester, or a diphenyl ester, preferably the dimethyl ester, the dipropyl ester, the diisopropyl ester, or the diphenyl ester.

In one embodiment, the glycol component of the present invention is from 5 to 85 mole % 2,2,4,4-tetramethyl-1,3-cyclobutanediol and from 15 to 95 mole % ethylene glycol, wherein the sum of the glycols is 100 mole %. Copolyesters containing less than about 5 mole % 2,2,4,4-tetramethyl-1, 3-cyclobutanediol do not show the unexpected increased melt strength and reduced sag, even with an increase in molecular weight. Copolyesters containing more than about 85 mole % 2,2,4,4-tetramethyl-1,3-cyclobutanediol units are also too viscous to allow for preparation in the melt.

In one embodiment, the glycol component is from 10 to 70 mole % 2,2,4,4-tetramethyl-1,3-cyclobutanediol and from 30 to 90 mole % ethylene glycol. In another embodiment, the glycol component is from 25 to 50 mole % 2,2,4,4-tetramethyl-1,3-cyclobutanediol and from 50 to 75 mole % ethylene glycol.

In another embodiment, the glycol component comprises a modifying glycol. In one embodiment, the modifying glycol is at least 1 mole % of the glycol component. In another embodiment, the modifying glycol comprises 1,2-propanediol, 1,3-propanediol, neopentyl glycol, 1,5-pentanediol, 1,6-hexanediol, cis-1,4-cyclohexanedimethanol, trans-1,4-cyclohexanedimethanol, p-xylene glycol, a polyethylene glycol, a polytetramethylene glycol, or a combination thereof.

The particular melt strengths and sags exhibited by the copolyesters of the present invention are dependant upon inherent viscosity. Inherent viscosity increases with increasing polymer molecular weight. Although higher melt strength and lower sag are not due to high molecular weight, the copolyesters of the present invention having virtually no sag have higher inherent viscosities than other copolyesters within the scope of the present invention having more sag.

In one embodiment, the inherent viscosity of the copolyester of the present invention, both prior to and after melt extrusion, is at least 0.3 dL/g, preferably at least 0.5 dL/g, and more preferably at least 0.8 dL/g, as determined at 25° C. in 60/40 wt/wt phenol/tetrachloroethane at a concentration of 0.5 g/100 mL.

The invention further relates to a method of determining the melt strength and sag of a polymer, comprising:

(a) extruding vertically (i.e., substantially parallel to the direction of the Earth's gravitational force) a polymer through a capillary having a diameter at a temperature and shear rate to produce an extrudate having a length of from 50 to 250 times the diameter of the capillary in from 5 to 100 seconds;

(b) measuring the diameter of the extrudate from step (a) at a point of from 25 to 50% above the lower end of the extrudate, and calculating the ratio of the diameter of the extrusion capillary to the diameter of the extrudate; and (c) measuring the length of the extrudate from step (a) at a given time, and calculating the ratio of the measured length and the hypothetical unsagged length.

The invention further relates to a method of determining the melt strength and sag of a polymer comprising the steps of:

1) extruding vertically a polymer through a capillary having a diameter at a temperature and shear rate sufficient to provide an extrudate having a length of about 50 to 250 times the diameter of the capillary in about 5 to 100 seconds, and 2) measuring the diameter of the extrudate at a point about 25 to 50% above the lower end of the extrudate, and calculating the ratio of the diameter of the extrusion capillary to the diameter of the extrudate, and 3) measuring the length of the extrudate at a given time, and calculating the ratio of the length measured and the hypothetical unsagged length.

The dimensional stability of polymer parisons during extrusion has heretofore been typically been analyzed in the blow-molding industry by comparing the sagged vertical lengths of polymer extrudates at a particular time. This length is influenced by both melt strength and die swell. The applicants have invented a new testing method for differentiating the separate effects of die swell and sag upon overall melt strength.

The "% sag" is herein defined as the ratio, in %, of extrudate sag ($\Delta L$) and the hypothetical unsagged length ($L_o$) after a specified extrusion time. The hypothetical unsagged length ($L_o$) can be determined by extending the initial straight portion of the curve formed in a plot of extrusion length versus time. The amount of sag ($\Delta L$) is calculated as the difference in the actual extrudate length (L), influenced by both sag and die swell, and the hypothetical unsagged length ($L_o$), influenced by die swell alone. % sag is calculated according to the Equations (1) and (2) below.

$$\Delta L = L - L_0 \quad (1)$$

$$\%Sag = \frac{\Delta Lx}{L_0} \times 100 \quad (2)$$

In another embodiment, the relative effect of die swelling of different polymers can be compared by eliminating the sag strengths from the overall melt strengths, as determined according to the method shown above. In order to directly compare melt strengths of different polymers tested by the method shown above, the extrusion capillary diameter, temperature, shear rate, length of extrudate, and distance measured on the extrudate should be equivalent for all polymers tested. The present method is preferably conducted using a capillary rheometer and a video camera aided by a personal computer.

In one embodiment, the extrusion temperature is from the melting point of the polymer to less than 280° C., preferably from 200 to 265° C. In another embodiment, the shear rate is from 0 to 500 sec$^{-1}$, preferably from 10 to 50 sec$^{-1}$. In another embodiment, the extrusion capillary used has a capillary diameter of from 0.1 to 0.5 inches, preferably about 0.2 to 0.3 inches. In another embodiment, the length of the extrudate formed in Step 1 is from 50 to 250 times the diameter of the extrusion capillary. In another embodiment, the sagged length of the extrudate is measured at from 30 to 50 seconds in step (c), preferably at 40 seconds.

In another embodiment, the copolyester has melt strength of at least (−40) % and sag of from 0 to 60%, determined by the method described above, using a capillary having a diameter of 0.100 inch, at an extrusion temperature of 200 to 265° C., a shear rate of 15 per second, and a sag time of 10 seconds.

The determination of a negative melt strength ratio by step (a) of the present test method indicates that the extrudate was determined to have a smaller diameter than the capillary diameter at the point measured. A positive ratio indicates that the measured extrudate diameter was larger than the capillary diameter.

In one embodiment, The copolyester of the present invention has a melt strength of at least (−40) %, preferably at least (−12) %, more preferably at least 1%, even more preferably at least 10%, and still more preferably at least 35%, as determined by the test method of the present invention using extrusion temperatures between about 200 to 265° C. The polyester of the present invention exhibits 0 to 60% sag, more preferably 0 to 30% sag, even preferably from 0 to 15% sag, and still more preferably from 0 to 5% sag, as determined by the test method of the present invention, at 10 seconds after extrusion, at extrusion temperatures of from 200 to 265° C.

The invention further relates to a method of producing a copolyester, comprising:
 (a) admixing:
  (i) a dicarboxylic acid component, comprising from 80 to 100 mole % terephthalic acid or the corresponding ester thereof, and from 0 to 20 mole % of a modifying aromatic dicarboxylic acid having less than or equal to 20 carbon atoms or the corresponding ester thereof, wherein the total mole % of dicarboxylic acid component is equal to 100 mole %; and
  (ii) a glycol component, comprising from 5 to 85 mole % 2,2,4,4-tetramethyl-1,3-cyclobutanediol, ethylene glycol of from 15 to 95 mole %, and least 1 mole % of a modifying glycol having from 3 to 16 carbon atoms, wherein the total mole % of glycol component is equal to 100 mole %, and heating the admixture at a temperature of from 150° C. to 220° C. in the presence of a catalyst;
 (b) further heating the admixture of step (a) at from 220 to 320° C.; and
 (c) applying a vacuum to remove the glycol component that did not react with the dicarboxylic acid component to produce the copolyester.

The invention further relates to a process for producing the copolyester, comprising:
 (1) heating:
  (a) about 80 to 100 mol % terephthalic acid or corresponding esters thereof, and 0 to about 20 mole % modifying aromatic dicarboxylic acids having about 2 to 20 carbon atoms or corresponding esters thereof, wherein the total mole % of dicarboxylic acids is equal to 100 mole %; and
  (b) about 5 to 85 mole % 2,2,4,4-tetramethyl-1,3-cyclobutanediol, about 15 to 95 mole % ethylene glycol, and less than 10 mole % modifying glycols having 3 to 16 carbon atoms, wherein the total mole % of glycols is equal to 100 mole %,
  at a temperature of about 150° C. to 220° C. in the presence of a catalyst for a time sufficient to react a significant portion of the distillable ethylene glycol; and
 (2) further heating the mixture of step (1) at about 220 to 320° C. for about 1 to 2 hours; and
 (3) thereafter, applying a vacuum sufficient to remove any unreacted glycols.

The copolyesters of the present invention can be formed by any suitable method known in the art. In one embodiment, the copolyesters of the present invention are prepared by heating a mixture of the dicarboxylic acid and glycol components, as disclosed above, in the presence of a catalyst at a temperature of from 150 to 220° C. for a time sufficient to react a significant portion of the distillable ethylene glycol. The time required to react a significant portion of the distillable ethylene glycol can vary depending upon the temperature and duration of the heating step in step (a). In one embodiment, the heating step of step (a) is from 1 to 2 hours. In another embodiment, the catalyst used is a zinc or tin compound. Examples of zinc and tin compounds include, but are not limited to, dibutyltin oxide, dibutyltin diacetate, dibutyltin dilaureate, titanium tetraisopropoxide, or a combination thereof.

After the initial heating step of step (a), the admixture is further heated at from 220 to 320° C. In another embodiment, the heating step of step (b) is from 2 to 3 hours. After the heating step, a vacuum can be applied to remove the unreacted glycol component and by-products in order to increase the molecular weight of the copolyester. In one embodiment, the vacuum is below at least 0.5 mm pressure.

The copolyesters of the present invention exhibit improved dimensional stability with increasing inherent viscosities. However, a copolyester having a viscosity greater than about 1.5 dL/g would not be useful for commercial blow-molding due to poor machinability.

The invention further relates to a blend, comprising:
 (a) from 5 to 95 weight % of a copolyester, comprising:
  (i) a repeat unit of a dicarboxylic acid component, comprising from 80 to 100 mole % terephthalic acid or the corresponding ester thereof, and from 0 to 20 mole % of a modifying aromatic dicarboxylic acid having less than or equal to 20 carbon atoms or the corresponding ester thereof, wherein the total mole % of dicarboxylic acid component is equal to 100 mole %; and
  (ii) a repeat unit of a glycol component, comprising from 5 to 85 mole % 2,2,4,4-tetramethyl-1,3- cyclobutanediol, ethylene glycol of from 15 to 95 mole %, and less than 10 mole % of a modifying glycol having from 3 to 16 carbon atoms, wherein the total mole % of glycol component is equal to 100 mole %, and (b) from 95 to 5 mole % of an additive.

The copolyester of the present invention can be blended with other compounds to form a blend composition. Suitable additives include, but are not limited to, NYLON 6,6 from DuPont; poly(ether-imides) such as ULTEM™ (a poly (etherimide) from General Electric); polyphenylene oxides, such as poly(2,6-dimethylphenylene oxide) or poly (phenylene oxide)/polystyrene blends such as NORYL 1000™ (a blend of poly(2,6-dimethylphenylene oxide and polystyrene resins from General Electric); polyesters; polyphenylene sulfides; polyphenylene sulfide/sulfones; poly(ester-carbonates); polycarbonates, such as LEXAN™ (a polycarbonate from General Electric); polysulfones; polysulfone ethers; and poly(ether-ketones) of aromatic dihydroxy compounds. The aromatic dihydroxy compounds used to prepare such polymers are disclosed in U.S. Pat. Nos. 3,030,335 and 3,317,466, the contents of which are hereby incorporated in their entirety by this reference.

In another embodiment, the additive can include, but is not limited to a flame retardant, such as a phosphorus compound; a halogen compound; a halogen compound in combination with an antimony compound a filler, such as talc or mica; a reinforcing agent, such as glass fiber; a poly(1,4-phenylene terephthalamide), such as KEVLAR™ from DuPont, or a carbon fiber.

The copolyesters and blends of the present invention can be made into articles. In one embodiment, the copolyester or blend can be made into a fiber, a film, a molded article, or a sheet. The methods of forming the copolyesters into fibers, films, molded articles and sheeting are well known in the art. In another embodiment, the copolyester or blend can be molded using art-known methods into an oriented or unoriented hollow article, preferably a container.

EXAMPLES

The following examples are put forth so as to provide those of ordinary skill in the art with a complete disclosure and description of how the compositions of matter and methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at room temperature and pressure is at or near atmospheric.

The inherent viscosity of the polyesters was determined in 60/40 (wt/wt) phenol/tetrachloroethane at a concentration of 0.5 g/100 ml at 25° C. The glass transition temperatures were determined using a TA 2100 from Thermal Analyst Instrument at a scan rate of 20° C./min. The glycol content of the compositions was determined by proton nuclear magnetic resonance spectroscopy (NMR).

Melt strength and sag were determined on an Instron Capillary Rheometer Model 3211 using a capillary having a diameter of 0.100 inch and a length of 0.250 inch (L/D=2.5). The polymer samples were dried for 24 hours in a vacuum oven of from 80 to 100° C. and then loaded into the Instron barrel. After an equilibration time of 5 minutes in the heated capillary barrel, the polymer was extruded at a shear rate of 15 per second.

Melt strength was calculated as the ratio of the diameter of the capillary (0.10 inch) to the diameter of the 19-inch polymer extrudate at a distance 6 inches above the end of the extrudate, times 100%. The % sag was calculated as the ratio, in %, of the sagged length ($\Delta L$) and the hypothetical unsagged length ($L_o$) after ten seconds. See Equations (1) and (2) above.

Example 1A (Control)

This example illustrates a copolyester outside of the scope of the present invention. The polyester used was PET 7352™, available from Eastman Chemical Company. This polyethylene terephthalate homopolyester does not exhibit unexpectedly good melt strength and sag. The results are shown in Table 1.

Example 1B

This example illustrates the preparation of the copolyester by using 100 mole % terephthalic acid, 5 mole % 2,2,4,4-tetramethyl-1,3-cyclobutanediol (50/50 trans/cis), and 95 mole % ethylene glycol.

A mixture of 194.0 g (1.00 mole) dimethyl terephthalate, 10.1 g (0.07 mole) 2,2,4,4-tetramethyl-1,3-cyclobutanediol (50/50 trans/cis), 119.7 g (1.93 moles) ethylene glycol, 0.048 g manganese acetate (55 ppm Mn), 0.117 g titanium tetraisopropoxide (100 ppm Ti), 0.047 g cobalt acetate (80 ppm Co) and 0.265 g ZONYLA™ (110 ppm P), a phosphate stabilizer available from the DuPont company, was placed in a 1-L flask equipped with an inlet for nitrogen, a metal stirrer, and a short distillation column. The flask was placed in a Belmont metal bath already heated to 190° C. and the contents of the flask were heated at 190° C. for about 3 hours. Then the temperature was raised progressively to 220° C. for about 2 hours, and then to 240° C. for about 45 minutes. The temperature was raised to 260° C. and a vacuum of 0.5 mm pressure was gradually applied over the next 3 to 5 minutes while the temperature was raised to 280° C. Full vacuum was maintained for about 30 minutes. A high melt viscosity, crystalline polymer was obtained having an inherent viscosity of 0.56 dL/g and a melting endotherm at 245° C.

The polymer was ground to pass a 3-mm screen, dried, and solid-state polymerized for 5.5 hours at 215° C. to give a polymer with an inherent viscosity of 0.74 dL/g. Upon extrusion at 260° C., the polymer had an inherent viscosity of 0.68 dL/g, a melt strength of (−50) %, and 52% sag. The results are shown on Table 1.

Example 1C

This example illustrates the preparation of the copolyester prepared from 100 mole % terephthalic acid, 10 mole % 2,2,4,4-tetramethyl-1,3-cyclobutanediol (50/50 trans/cis), and 90 mole % ethylene glycol.

A mixture of 194.0 g (1.00 mole) dimethyl terephthalate, 21.6 g (0.15 mole) 2,2,4,4-tetramethyl-1,3-cyclobutanediol (50/50 trans/cis), 114.7 g (1.85 moles) ethylene glycol, 0.049 g manganese acetate (55 ppm Mn), 0.119 g titanium tetraisopropoxide (100 pm Ti), 0.048 g cobalt acetate (80 pm Co) and 0.27 g ZONYL A™ (1 10 ppm P), a phosphate stabilizer available from the DuPont company, was placed in a 1-L flask equipped with an inlet for nitrogen, a metal stirrer, and a short distillation column. The flask was placed in a Belmont metal bath already heated to 190° C. and the contents of the flask were heated at 190° C. for about 3 hours. Then the temperature was raised progressively to 220° C. for about 2 hours, and then to 240° C. for about 45 minutes. The temperature was raised to 260° C. and a vacuum of 0.5 mm pressure was gradually applied over the next 3 to 5 minutes while the temperature was raised to 280° C. Full vacuum was maintained for about 30 minutes. A high melt viscosity, crystalline polymer was obtained with an inherent viscosity of 0.60 dL/g and a melting endotherm at 224° C.

The polymer was ground to pass a 3-mm screen, dried, and solid-state polymerized for 5.5 hours at 215° C. Upon extrusion at 240° C., the copolyester had a melt strength of (−12) % and 17% sag. The results are shown on Table 1.

Example 1D

This example illustrates the preparation of the copolyester prepared from 100 mole % terephthalic acid, 34 mole % 2,2,4,4-tetramethyl-1,3-cyclobutanediol, and 66 mole % ethylene glycol.

A mixture of 194.0 g (1.00 mole) dimethyl terephthalate, 72.0 g (0.50 mole) 2,2,4,4-tetramethyl-1,3-cyclobutanediol (50/50 trans/cis), 93.0 g (1.50 moles) ethylene glycol, 0.13 g titanium tetraisopropoxide (100 ppm Ti), 0.19 g dibutyltin oxide (400 pm Sn), and 0.22 g IRGANOX 1010™ was placed in a 1-L flask equipped with an inlet for nitrogen, a metal stirrer, and a short distillation column. The flask was placed in a Belmont metal bath already heated to 190° C. and the contents of the flask were heated at 190° C. for about 3 hours. Then the temperature was raised progressively to 220° C. for 1 hour, then to 240° C. for about 45 minutes and then to 260° C. for about 45 minutes. A vacuum of 0.5 mm pressure was gradually applied over the next 3 to 5 minutes. The temperature was raised to a final reaction temperature of 280° C. Full vacuum was maintained for about 20 minutes. An amorphous, high melt viscosity polymer was obtained with an inherent viscosity of 0.50 dL/g and a glass transition temperature of 101° C.

The polymer was ground to pass a 3-mm screen and dried. Upon extrusion at 200° C., the copolyester was determined to have a melt strength of 36% and 18% sag. Upon extrusion at 220° C., the polymer melt strength was determined to be (−12) % and had 47% sag.

Example 1E

A copolyester having the same composition as Example 1D was prepared to an inherent viscosity of 0.59 dL/g. The polymer was ground to pass a 3-mm screen and dried. Upon extrusion at 220° C., the copolyester was determined to have a melt strength of 1% and 14% sag.

Example 1F

A copolyester having the same composition as Example 1D was prepared to an inherent viscosity of 0.65 dL/g. The polymer was ground to pass a 3-mm screen and dried. Upon extrusion at 220° C., the copolyester was determined to have a melt strength of 6% and 12% sag.

Example 1G

A copolyester having the same composition as Example 1D was prepared to an inherent viscosity of 0.88 dL/g. The polymer was ground to pass a 3-mm screen and dried. Upon extrusion at 200° C., the copolyester was determined to have a melt strength of 55% and no sag.

Examples 1H and 1I

These copolyesters were prepared in a manner similar to Example 1B and 1D above, using concentrations of 2,2,4-tetramethyl-1,3-cyclobutanediol shown in Table 1. The results are shown in Table 1.

Example 2 (Comparison)

This Example illustrates the unexpected superior melt strength and sag of the copolyesters prepared in Example 1 by comparison with copolyesters from terephthalic acid, ethylene glycol, and 1,4-cyclohexanedimethanol (PET/CHDM copolyester). The PET/CHDM copolyester is an excellent comparison copolyester because, like the copolyester of the present invention, it is linear and of similar molecular weight. The PET/CHDM copolyester is also an excellent benchmark for comparison purposes since it demonstrates the heretofore best physical properties for blow-molding of any of the known copolyesters.

Example 2A

This copolyester was the same copolyester of Example 1A. The polyester used was PET 7352™, available from Eastman Chemical Company. The results are shown in Table 2.

Example 2B

A copolyester consisting of 100 mole % terephthalic acid units, 5 mole % 1,4-cyclohexanedimethanol (70/30 trans/cis), and 95 mole % ethylene glycol was prepared as in Example 1 in a semi-works continuous production line. Upon extrusion at 265° C., the copolymer was determined to have a melt strength of (−17) %, which was better than the melt strength of (−50) % of Example 1B, extruded at 260° C. However, the copolyester of Example 2B had 93% sag at 265° C., about 43% more sag than the copolyester of Example 1B which had only 52% sag when extruded at 260° C. This example illustrates that there is a substantial unexpected improvement in the sag of the copolyester of the present invention with a concentration of merely 5 mole % 2,2,4,4-tetramethyl-1,3-cyclobutanediol in the glycol component of the copolyester. The results are shown in Table 2.

Example 2C–2D

The copolyesters of Examples 2C and 2D were prepared by the method of Example 2B using the mole percentages shown in Table 2. The results are shown in Table 2. Examples 2C and 2D can be compared to Example 1C in Table 1. Example 1C had much better melt strength and sag than either Example 2C or 2D.

Example 2E

The present example illustrates a copolyester consisting of 100 mole % terephthalic acid, 31 mole % 1,4-cyclohexanedimethanol (70/30 trans/cis) units, and 69 mole % ethylene glycol units, known as PETG 6763™, available from Eastman Chemical Company. Upon extrusion of dried polymer pellets at 200° C., the copolyester was determined to have a melt strength of (−4) % and 15% sag. Upon extrusion at 220° C., the copolyester had a melt strength of (−22) % and 28% sag.

The copolyester of Example 2E can be compared to the copolyesters of the present invention shown in Examples 1F and 1G, having comparable inherent viscosities and composition.

Example 2F

The present example illustrates a copolyester consisting of 100 mole % terephthalic acid, 65 mole % 1,4- cyclohexanedimethanol (70/30 trans/cis), and 35 mole % ethylene glycol, known as PCTG 5445™, available from Eastman Chemical Company.

Upon extrusion at 265° C., the copolyester was determined to have a melt strength of (−54) % and 102% sag. This Example can be compared to Example 1H in Table 1. The difference in sag and melt strength between these two otherwise comparable copolyesters is tremendous.

As can be seen by general comparison of Table 1 and Table 2, the copolyesters of the present invention, shown in Table 1, have significantly improved melt strength and sag, as compared to the PET/CHDM copolyesters of Example 2. It can also be seen that the copolyester of the present invention exhibits improved melt strength and sag with increasing concentrations of 2,2,4,4-tetramethyl-1,3-cyclobutanediol. The PET/CHDM copolyester does not follow the same trend upon increasing concentrations of 1,4-cyclohexanedimethanol.

One of ordinary skill in the art can easily see how the copolyester of the present invention would be beneficial in blow-molding applications, as well as in other applications.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

TABLE 1

Melt Strength and Sag Performance of Polyethylene Terephthalate Modified with 2,2,4,4-Tetramethyl-1,3-Cyclobutanediol

| Ex. | TMCD mol % | Temp (° C.) | I.V. before | I.V. after | Sag % | Melt Strength % |
|---|---|---|---|---|---|---|
| 1A | 0 | 265 | 0.69 | — | 99 | −64 |
| 1B | 5 | 250 | 0.74 | 0.68 | 60 | −45 |
| 1B | 5 | 260 | 0.74 | 0.68 | 52 | −50 |
| 1C | 10 | 240 | 0.80 | 0.73 | 17 | −12 |
| 1C | 10 | 240 | 0.87 | 0.76 | 16 | −7 |
| 1D | 10 | 200 | 0.50 | 0.51 | 18 | 36 |
| 1D | 10 | 220 | 0.50 | 0.50 | 47 | −12 |
| 1E | 10 | 220 | 0.59 | 0.60 | 14 | 1 |
| 1F | 10 | 220 | 0.65 | 0.59 | 12 | 6 |
| 1G | 10 | 200 | 0.88 | 0.84 | 0 | 55 |
| 1H | 68 | 265 | 0.68 | — | 8 | 6 |
| 1I | 84 | 265 | 0.42 | 0.42 | 7 | 4 |

TABLE 2

Melt Strength and Sag Performance of Polyethylene Terephthalate Modified with 1,4-Cyclohexanedimethanol

| Ex. | CHDM mol % | Temp (° C.) | I.V. before | I.V. after | Sag % | Melt Strength % |
|---|---|---|---|---|---|---|
| 2A | 0 | 265 | 0.69 | — | 99 | −64 |
| 2B | 5 | 265 | 0.72 | — | 93 | −17 |
| 2C | 8 | 265 | 0.76 | — | 114 | −54 |

TABLE 2-continued

Melt Strength and Sag Performance of Polyethylene Terephthalate Modified with 1,4-Cyclohexanedimethanol

| Ex. | CHDM mol % | Temp (° C.) | I.V. before | I.V. after | Sag % | Melt Strength % |
|---|---|---|---|---|---|---|
| 2D | 14 | 265 | 0.75 | — | 91 | −57 |
| 2E | 31 | 200 | 0.72 | — | 15 | −4 |
| 2E | 31 | 220 | 0.72 | — | 28 | −22 |
| 2F | 65 | 265 | 0.72 | — | 102 | −54 |

TMCD = 2,2,4,4-Tetramethyl-1,3-cyclobutanediol (50/50 trans/cis).
CHDM = 1,4-cyclohexanedimethanol (70/30 trans/cis).
I.V. before and after = inherent viscosity measured prior to and after extrusion.

What is claimed is:

1. A copolyester, comprising:
   (a) a repeat unit of a dicarboxylic acid component, comprising from 80 to 100 mole % terephthalic acid or the corresponding ester thereof, and from 0 to 20 mole % of a modifying aromatic dicarboxylic acid having less than or equal to 20 carbon atoms or the corresponding ester thereof, wherein the total mole % of dicarboxylic acid component is equal to 100 mole %; and
   (b) a repeat unit of a glycol component, comprising from 25 to 50 mole % 2,2,4,4-tetramethyl-1,3-cyclobutanediol, ethylene glycol of from 50 to 75 mole %, and at least 1 mole % of a modifying glycol having from 3 to 16 carbon atoms, wherein the total mole % of glycol component is equal to 100 mole %.

2. The copolyester of claim 1, wherein the dicarboxylic acid component comprises from 90 to 100 mole % terephthalic acid or the ester thereof.

3. The copolyester of claim 1, wherein the dicarboxylic acid component is 100 mole % terephthalic acid or the ester thereof.

4. The copolyester of claim 1, wherein the modifying aromatic dicarboxylic acid comprises isophthalic acid; 4,4'-biphenyldicarboxylic acid; 1,4-naphthalenedicarboxylic acid; 1,5-naphthalenedicarboxylic acid; 2,6-naphthalenedicarboxylic acid; 2,7-naphthalenedicarboxylic acid; trans-4,4'-stilbenedicarboxylic acid; or a combination thereof.

5. The copolyester of claim 1, wherein the modifying aromatic dicarboxylic acid is less than 10 mole % of the dicarboxylic acid repeat unit.

6. The copolyester of claim 1, wherein the dicarboxylic acid component further comprises an aliphatic dicarboxylic acid having from 2 to 16 carbon atoms.

7. The copolyester of claim 6, wherein the aliphatic dicarboxylic acid comprises malonic acid, succinic acid, glutaric acid, adipic acid, pimelic acid, suberic acid, azelaic acid, dodecanedioic acid, or a combination thereof.

8. The copolyester of claim 6, wherein the aliphatic dicarboxylic acid is less than 10 mole % of the dicarboxylic acid repeat unit, wherein the sum of the terephthalic acid, the modifying aromatic dicarboxylic acid, and the aliphatic dicarboxylic acid is equal to 100 mole %.

9. The copolyester of claim 1, wherein the modifying glycol comprises 1,2-propanediol, 1,3-propanediol, neopentyl glycol, 1,5-pentanediol, 1,6-hexanediol, cis-1,4-cyclohexanedimethanol, trans-1,4-cyclohexanedimethanol, p-xylene glycol, a polyethylene glycol, a polytetramethylene glycol, or a combination thereof.

10. The copolyester of claim 1, wherein the copolyester has an inherent viscosity of at least 0.3 dL/g, as determined at 25° C. in 60/40 wt/wt phenol/tetrachloroethane at a concentration of 0.5 g/100 mL.

11. The copolyester of claim 10, wherein the inherent viscosity is at least 0.5 dL/g.

12. The copolyester of claim 10, wherein the inherent viscosity is at least 0.8 dL/g.

13. The copolyester of claim 1, wherein said copolyester has melt strength of at least (−40) % and sag of from 0 to 60%, determined by extruding, substantially vertically, a polymer through a capillary having a selected diameter at a temperature and shear rate to produce an extrudate having an upper and a lower end and having a length of from 50 to 250 times the selected diameter of the capillary in from 5 to 100 seconds; and measuring the diameter of the extrudate at a point of from 25 to 50% above the lower end of the extrudate, and calculating the ratio of the selected diameter of the capillary to the diameter of the extrudate, wherein the capillary has a diameter of 0.100 inch, at an extrusion temperature of 200 to 265° C., and measuring the length of the extrudate at a given time, and calculating the ratio of the measured length and the hypothetical unsagged length, wherein the shear rate is 15 per second and the sag time is 10 seconds.

14. The copolyester of claim 13, wherein the copolyester has a melt strength of at least 1% and a sag of 0 to about 30%.

15. A method of producing a copolyester, comprising:
 (a) admixing:
  (i) a dicarboxylic acid component, comprising from 80 to 100 mole % terephthalic acid or the corresponding ester thereof, and from 0 to 20 mole % of a modifying aromatic dicarboxylic acid having less than or equal to 20 carbon atoms or the corresponding ester thereof, wherein the total mole % of dicarboxylic acid component is equal to 100 mole %; and
  (ii) a glycol component, comprising from 5 to 85 mole % 2,2,4,4-tetramethyl-1,3-cyclobutanediol, ethylene glycol of from 15 to 95 mole %, and least 1 mole % of a modifying glycol having from 3 to 16 carbon atoms, wherein the total mole % of glycol component is equal to 100 mole %, and
 heating the admixture at a temperature of from 150° C. to 220° C. in the presence of a catalyst;
 (b) further heating the admixture of step (a) at from 220 to 320° C.; and
 (c) applying a vacuum to remove the glycol component that did not react with the dicarboxylic acid component to produce the copolyester.

16. The method of claim 15, wherein the catalyst comprises a zinc or tin compound.

17. The method of claim 15, wherein the catalyst comprises dibutyltin oxide, dibutyltin diacetate, dibutyltin dilaureate, titanium tetraisopropoxide, or a combination thereof.

18. The method of claim 15, wherein the heating step of step (a) is from 1 to 2 hours.

19. The method of claim 15, wherein the heating step of step (b) is from 2 to 3 hours.

20. The method of claim 15, wherein the vacuum is at least 0.5 mm pressure.

21. An article made from the copolyester of claim 1.

22. The article of claim 21, wherein the article is an oriented or unoriented hollow article.

* * * * *

UNITED STATES PATENT AND TRADEMARK OFFICE
CERTIFICATE OF CORRECTION

PATENT NO. : 5,989,663
DATED : November 23, 1999
INVENTOR(S) : John C. Morris, James R. Bradley and Kab Sik Seo It is certified that error appears in the above-identified patent and that said Letters Patent is hereby corrected as shown below:

<u>Title page,</u>
Item [60], Related U.S. Application Data, please delete the phrase "Dec. 30, 1996." and substitute therefor: -- Dec. 28, 1996. --

Signed and Sealed this

Eighteenth Day of March, 2003

JAMES E. ROGAN
*Director of the United States Patent and Trademark Office*

UNITED STATES PATENT AND TRADEMARK OFFICE
CERTIFICATE OF CORRECTION

PATENT NO.    : 5,989,663
DATED         : November 23, 1999
INVENTOR(S)   : John C. Morris, James R. Bradley and Kab Sik Seo It is certified that error appears in the above-identified patent and that said Letters Patent is hereby corrected as shown below:

Column 1,
Line 9, delete "30," and substitute therefor: -- 28, --

Signed and Sealed this

Sixteenth Day of December, 2003

JAMES E. ROGAN
*Director of the United States Patent and Trademark Office*